United States Patent
Chang et al.

(10) Patent No.: US 8,447,809 B2
(45) Date of Patent: May 21, 2013

(54) SYSTEM AND METHOD FOR NETWORK CONFERENCE

(75) Inventors: Rong-Wen Chang, Fremont, CA (US); John K. Lee, Fremont, CA (US); Ron Lin, Fremont, CA (US)

(73) Assignee: Via Technologies, Inc., New Taipei (TW)

( * ) Notice: Subject to any disclaimer, the term of this patent is extended or adjusted under 35 U.S.C. 154(b) by 487 days.

(21) Appl. No.: 12/390,565

(22) Filed: Feb. 23, 2009

(65) Prior Publication Data

US 2009/0222518 A1 Sep. 3, 2009

Related U.S. Application Data

(60) Provisional application No. 61/032,446, filed on Feb. 29, 2008.

(51) Int. Cl.
*G06F 15/16* (2006.01)

(52) U.S. Cl.
USPC .......................................... 709/204; 370/259

(58) Field of Classification Search
USPC .......................................... 709/204; 370/259
See application file for complete search history.

(56) References Cited

U.S. PATENT DOCUMENTS

| 5,729,687 | A * | 3/1998 | Rothrock et al. | 709/204 |
| 2003/0105820 | A1 * | 6/2003 | Haims et al. | 709/205 |
| 2007/0203980 | A1 * | 8/2007 | Andersen | 709/204 |
| 2007/0239899 | A1 * | 10/2007 | Gonen et al. | 709/249 |

FOREIGN PATENT DOCUMENTS

TW 200844849 11/2008

OTHER PUBLICATIONS

English language translation of abstract of TW 200844849 (published Nov. 16, 2008).

* cited by examiner

*Primary Examiner* — Jude Jean Gilles
*Assistant Examiner* — Jaren M Means
(74) *Attorney, Agent, or Firm* — McClure, Qualey & Rodack, LLP

(57) ABSTRACT

The present invention provides at least an electronic system for network conference. The electronic system includes a user right module for storing and maintaining a plurality of user rights associated to each user of the electronic system, and a meeting right module for creating a meeting having a plurality of meeting rights according to associated user rights of a meeting creator. A participant right module is presented for determining a plurality of participant rights according to the plurality of meeting rights of the meeting and the associated user rights of a participant of the meeting. The system includes a plurality of participant client modules for receiving and sending media stream according to the plurality of participant rights of corresponding participant, and a matrix module for processing and distributing media stream to and from the plurality of participant client modules according to the plurality of participant rights.

20 Claims, 8 Drawing Sheets

User ID : a01
User Name : [a01] Requied ( Display Only )
Email : [    ]
Phone : [    ]

Change Password : ☐
New Password : [    ]
Confirm New Password : [    ]

☑ Right to caeate or manange a meeting with the following capabilities:
☑ Audio-In (Microphone)
☑ Video-In (Camera)
☑ Audio-Out (Speaker)
☑ Video-Out (Display)
☑ Record Rights
☑ File Transfer Right

FIG. 3

US 8,447,809 B2

SYSTEM AND METHOD FOR NETWORK CONFERENCE

CROSS REFERENCE TO RELATED APPLICATIONS

This application claims the benefit of U.S. Provisional Application No. 61/032446, filed Feb. 29, 2008.

BACKGROUND OF THE INVENTION

1. Field of the Invention

The present invention is generally related to system and method for network conference, and particularly related to a network conference system having individual changeable rights of each participant.

2. Description of the Related Art

In modern days, geographical restriction or physical separation of people at a working group does not impose a serious communication problem due to the utilization of telecommunication equipments. Pure audio or even video does not satisfy the full exchange of meaningful representation in some circumstances. Therefore, a remote conference or so-call teleconference system is provided to serve the need of a group meeting.

Please refer to FIG. 1, which shows a normal fixed design of a conventional teleconference system built on Internet as the interconnection network. In the upper part of such design, all participants are equal in capturing, encoding, and sending audio and video media streams into the interconnection network. For the receipt ends of the media streams, all incoming streams are decoded and played back to the speaker and display shown in the lower part of the FIG. 1. In some other PC based systems, participants can select the image of others to view on the display. But from the view point of sending and receiving data stream, for all participants, they have all equal rights and the system is equivalent to the conventional teleconference systems.

The drawback of conventional system is the lack of flexibility to configure a meeting according to some specific needs of various scenarios. Not each participant needs the same encoding and decoding requirements. However, the conventional systems do not consider the requirement to adjust the configurations or rights of each individual participant.

BRIEF SUMMARY OF INVENTION

In order to satisfy the needs of various scenarios to provide flexibility to configure a meeting accordingly, the present invention provides at least a network conference system having individual changeable rights of each participant.

In one aspect, an electronic system for network conference is provided in accordance with the present invention. The electronic system comprises a user right module for storing and maintaining a plurality of user rights associated to each user of the electronic system, and a meeting right module for creating a meeting having a plurality of meeting rights according to associated user rights of a meeting creator.

A participant right module is presented for determining a plurality of participant rights according to the plurality of meeting rights of the meeting and the associated user rights of a participant of the meeting, wherein one of the plurality of participant rights is granted in response to the corresponding meeting right and the corresponding user right are granted. The system comprises a plurality of participant client modules for receiving and sending media stream according to the plurality of participant rights of corresponding participant, and a matrix module for processing and distributing media stream to and from the plurality of participant client modules according to the plurality of participant rights.

In another aspect, a method for network conference in an electronic system is provided in accordance with an embodiment of the present invention. The electronic system having an user right module for storing and maintaining a plurality of user rights associated to each user of the electronic system. The method comprises creating a meeting having a plurality of meeting rights according to associated user rights of a meeting creator, and determining a plurality of participant rights according to the plurality of meeting rights of the meeting and the associated user rights of a participant of the meeting, wherein one of the plurality of participant rights is granted in response to the corresponding meeting right and the corresponding user right are granted. Two steps are also presented in the method: receiving and sending media stream, in a plurality of participant client modules of the electronic system, according to the plurality of participant rights of corresponding participant, and processing and distributing media stream, in a matrix module of the electronic system, to and from the plurality of participant client modules according to the plurality of participant rights.

Moreover, in a third aspect, an apparatus for determining a plurality of rights of each participant in a network conference system is provided. The apparatus comprises a first module for storing a plurality of meeting rights of a meeting according to associated user rights of a meeting creator, a second module for storing a plurality of participant rights according to associated user rights of a participant, and a third module for storing a plurality of dynamic rights according to assigned user rights of a meeting manager. Further, the apparatus comprises a determination module for determining one of the plurality of each participant is granted in response to the corresponding meeting right, the corresponding participant right, and the corresponding dynamic rights are all granted.

A detailed description is given in the following embodiments with reference to the accompanying drawings.

BRIEF DESCRIPTION OF DRAWINGS

The foregoing and a better understanding of the present invention will become apparent from the following detailed description of example embodiments and claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto.

FIG. 3 shows an exemplary screen shot of user account creation in accordance with an embodiment of the present invention.

DETAILED DESCRIPTION OF INVENTION

Before beginning a detailed description of the preferred embodiments of the invention, the following statements are in order. The preferred embodiments of the invention are described with reference to an exemplary teleconference system or an electronic system for network conference. However, the invention is not limited to the preferred embodiments in its implementation. The invention, or any aspect of the invention, may be practiced in any suitable teleconference system, including a multi-media phone system, multi-media server, multi-media player, or multi-source and broadcast center. Portions of the preferred embodiments are shown in block diagram form and described in this application without excessive detail in order to avoid obscuring the invention, and also in view of the fact that specifics with respect to implementation of such a system are known to those of ordinary skill in the art and may be dependent upon the circumstances. In other words, such specifics are variable but should be well within the purview of one skilled in the art. Conversely, where specific details are set forth in order to describe example embodiments of the invention, it should be apparent to one skilled in the art that the invention can be practiced without, or with variation of, these specific details. In particular, where particular display screens are mere examples and may be modified or replaced with different displays without departing from the invention.

Figure 1:
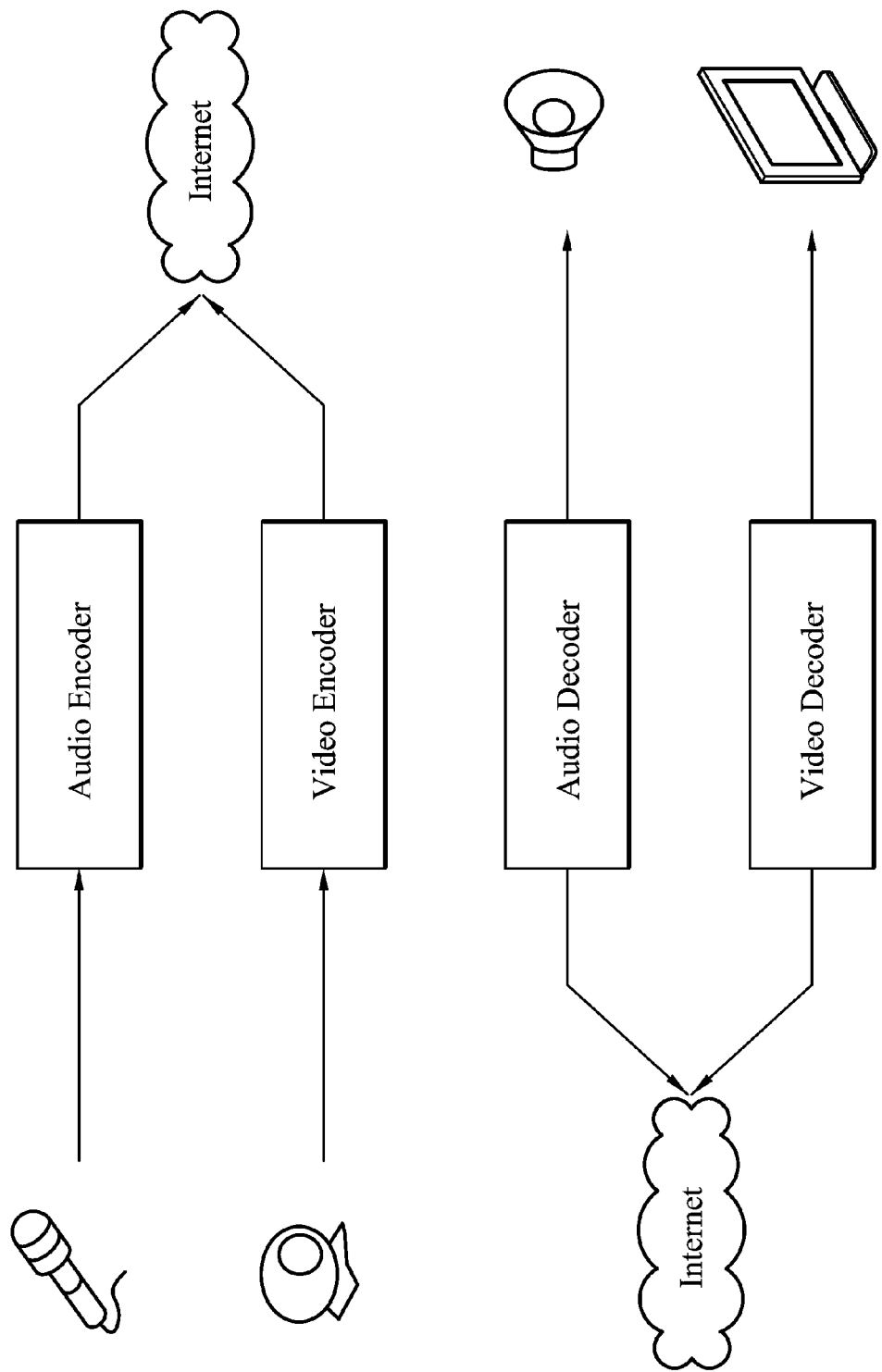
FIG. 1 illustrates an exemplary conventional teleconference system.
Figure 2:
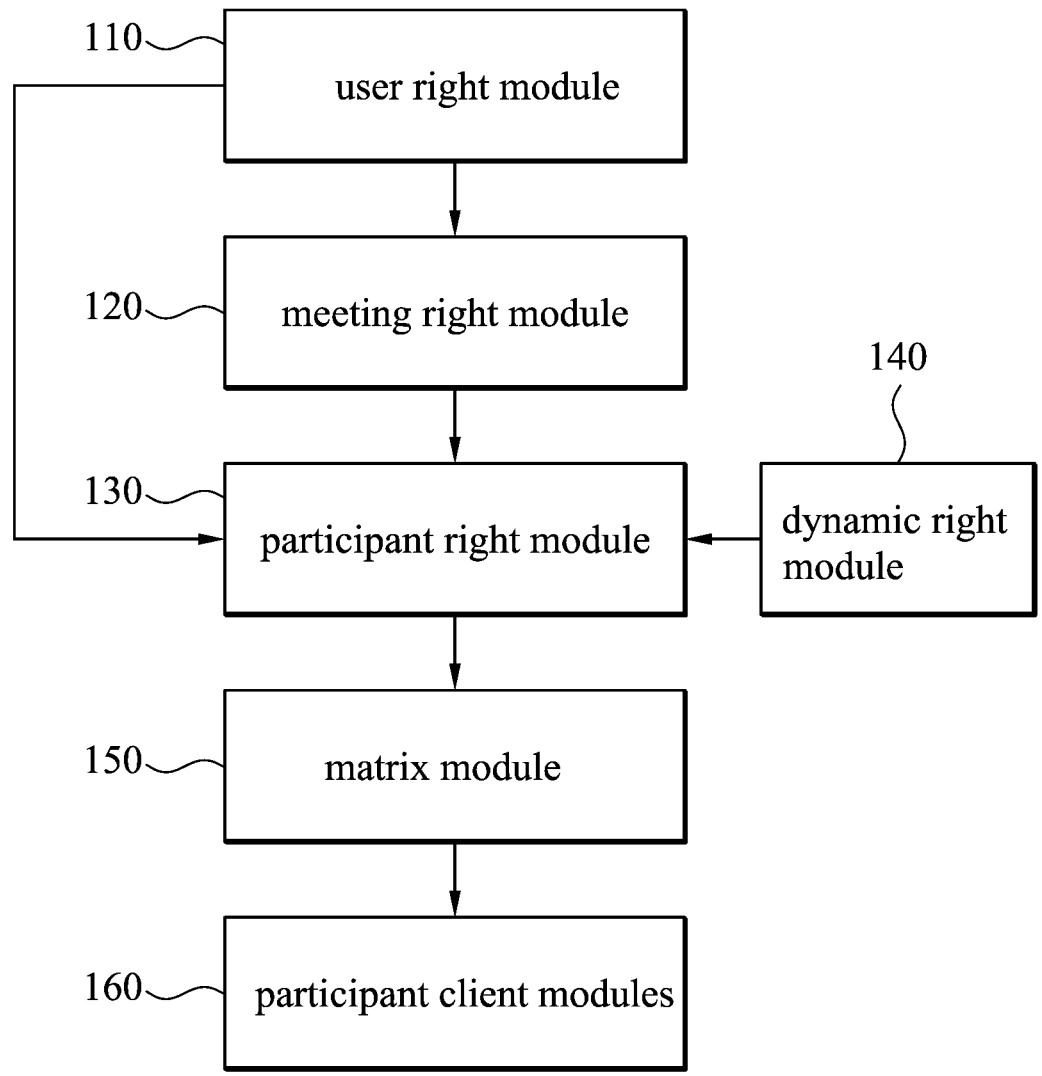
FIG. 2 illustrates an exemplary block diagram of an electronic system for network conference in accordance with an embodiment of the present invention.

Please refer to FIG. 2, which illustrates an exemplary block diagram of an electronic system for network conference in accordance with an embodiment of the present invention. The electronic system 100 comprises a user right module 110, a meeting right module 120, a participant right module 130, a dynamic right module 140, a matrix module 150, and a plurality of participant client modules 160. The electronic system 100 has a plurality of users. Each user is given a list of a plurality of user rights. The plurality of user rights or the list can be configured when the user account is added into the electronic system 100 or later by administrator of the electronic system 100.

Please refer to FIG. 3, which shows an exemplary screen shot of user account creation in accordance with an embodiment of the present invention. In this embodiment, the user rights associated to each user may include any combination of the followings: audio-in, video-in right, audio-out right, video-out right, meeting recording right, file transfer right, and meeting creation and management right. Audio-in right is a right to speak in the meeting; microphone does not work without the right. Audio-out right is a right to listen in the meeting; speaker does not work without the right. Video-in right is a right to send video to the meeting; webcam or camera does not work without the right. Video-out right is a right to see video from the meeting; no video from the meeting is displayed without the right. Meeting recording right is a right to record the meeting in a video file or streaming; the meeting can not be recorded without the right. File transfer right is a right to send file to other participants in the meeting; no file can be sent without the right. Meeting creation and management right is a right to create and manage a meeting; no meeting can be created without the right. The enumerated user rights above are listed as examples. The present invention does not limit claim scope in these user rights shown in this embodiment and FIG. 3.

Now please return to FIG. 2, the user right module 110 is configured for storing and maintaining a plurality of user rights associated to each user of the electronic system 100. In response to a meeting is created by a meeting creator, which has the meeting creation and management right, the meeting right module is configured for creating a meeting having a plurality rights according to associated user rights of the meeting creator. For example, if the creator do not have a specific user right, the corresponding meeting right of the meeting is not granted. More specifically, given the creator do not have file transfer right, the corresponding file transfer right of the meeting is also banned.

As shown in the FIG. 2, the participant right module 130 is configured for determining a plurality of participant rights according to the plurality of meeting rights of the meeting from the meeting right module 120 and the associated user rights of a participant of the meeting from the user right module 110. Merely one of the plurality of participant rights is granted in response to the corresponding meeting right and the corresponding user rights are granted. More specifically speaking, one participant is not allowed to have file transfer right when his user right is not allowed or when the meeting right is not allowed.

Figure 4:
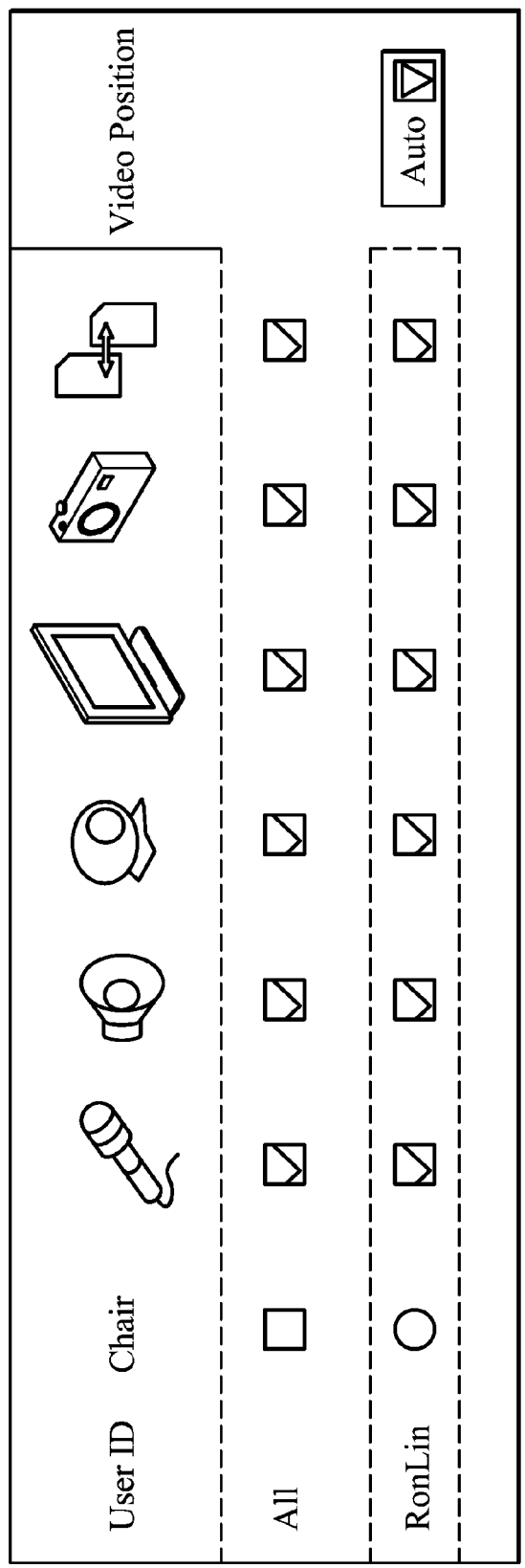
FIG. 4 depicts a screen shot example for a manager to check off a right of a participant in accordance with an embodiment of the present invention.

In one embodiment of the present invention, when the meeting is created, kicked off, or initialized by its creator, the creator may be given a management right as a meeting manager, which may be transferrable to other participants during the meeting. The dynamic right module 140 is configured to provide dynamic right assignment function to the electronic system 100. If the manager wants to remove a right of a specified participant, the manager can check off the right of the user in the dynamic right module 140. Please refer to FIG. 4, which depicts a screen shot example for a manager to check off a right of a participant. Therefore the participant right module 130 would further check the dynamic rights from the dynamic right module 140 to determine the plurality of participant rights.

After all participant rights are determined, the matrix module 150 may take advantages of these participant rights from the participant right module 130 for processing and distributing media stream to and from the plurality of the participant client modules 160. In one embodiment, the data stream may be processed, multiplexed, and/or de-multiplexed by any combination of the followings: audio stream, video stream, and data stream. In the same manner, the plurality of the participant client modules 160 are configured for receiving and sending media stream according to the plurality of participant rights of corresponding participant.

Figure 5:
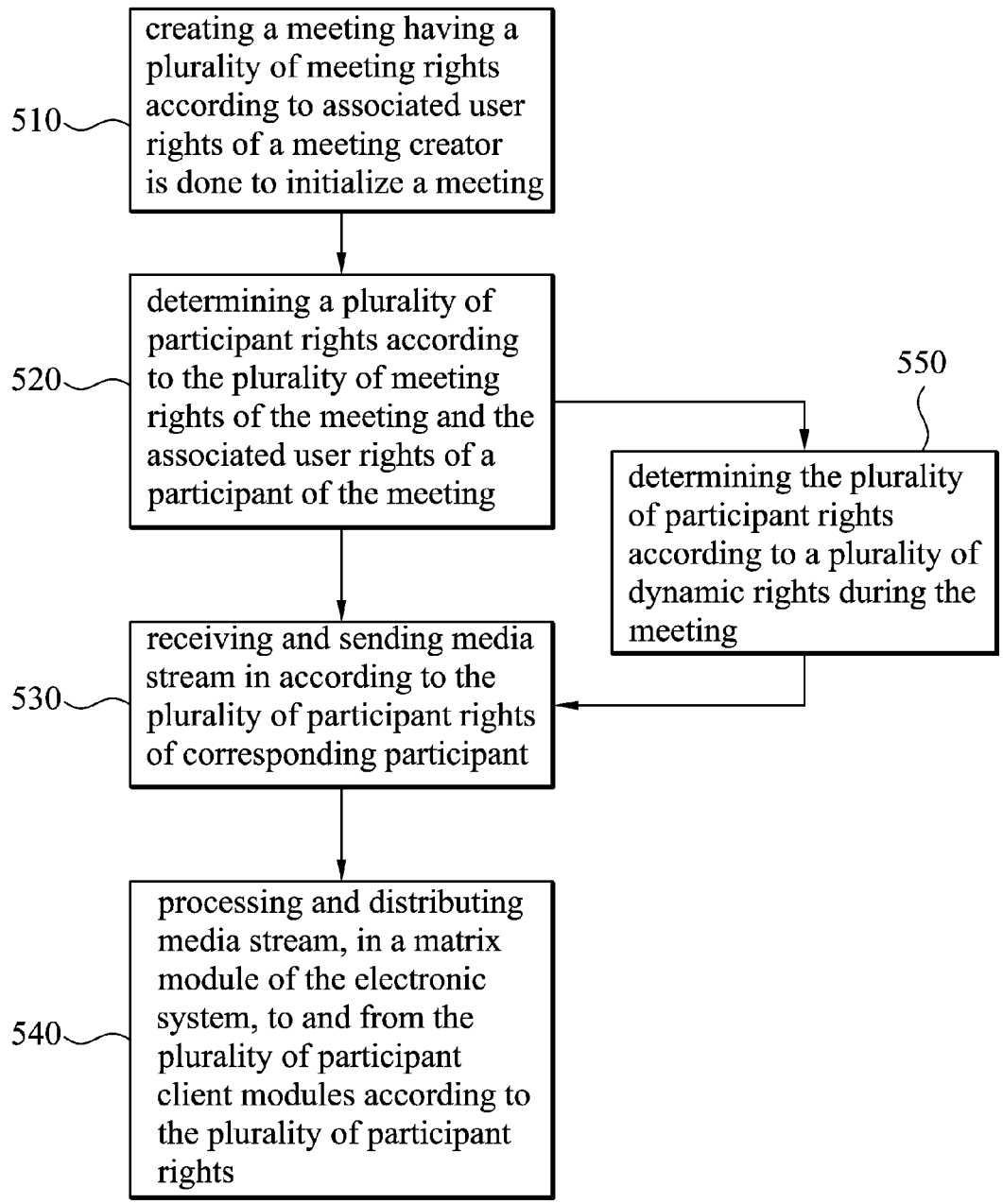
FIG. 5 illustrates a flowchart diagram for determining participant rights in accordance with a method embodiment of the present invention.

Please refer to FIG. 5, which illustrates a flowchart diagram for determining participant rights in accordance with a method embodiment of the present invention. In order to describe this method, it could be embodied in the electronic system 100. In a step 510, creating a meeting having a plurality of meeting rights according to associated user rights of a meeting creator is done to initialize a meeting. Following the step 510, there is a step 520 for determining a plurality of participant rights according to the plurality of meeting rights of the meeting and the associated user rights of a participant of the meeting, wherein one of the plurality of participant rights is granted in response to the corresponding meeting right and the corresponding user right are granted. In a plurality of participant client modules of the electronic system, there is a step 530 for receiving and sending media stream in according to the plurality of participant rights of corresponding participant. During the meeting, there is a step 540 for processing and distributing media stream, in a matrix module of the electronic system, to and from the plurality of participant client modules according to the plurality of participant rights.

Analogous to the dynamic right module 140 shown in the FIG. 2, following the step 520, an optional step 550 is configured for determining the plurality of participant rights according to a plurality of dynamic rights during the meeting, wherein one of the plurality of participant rights are granted if the corresponding dynamic right is granted.

Figure 6:
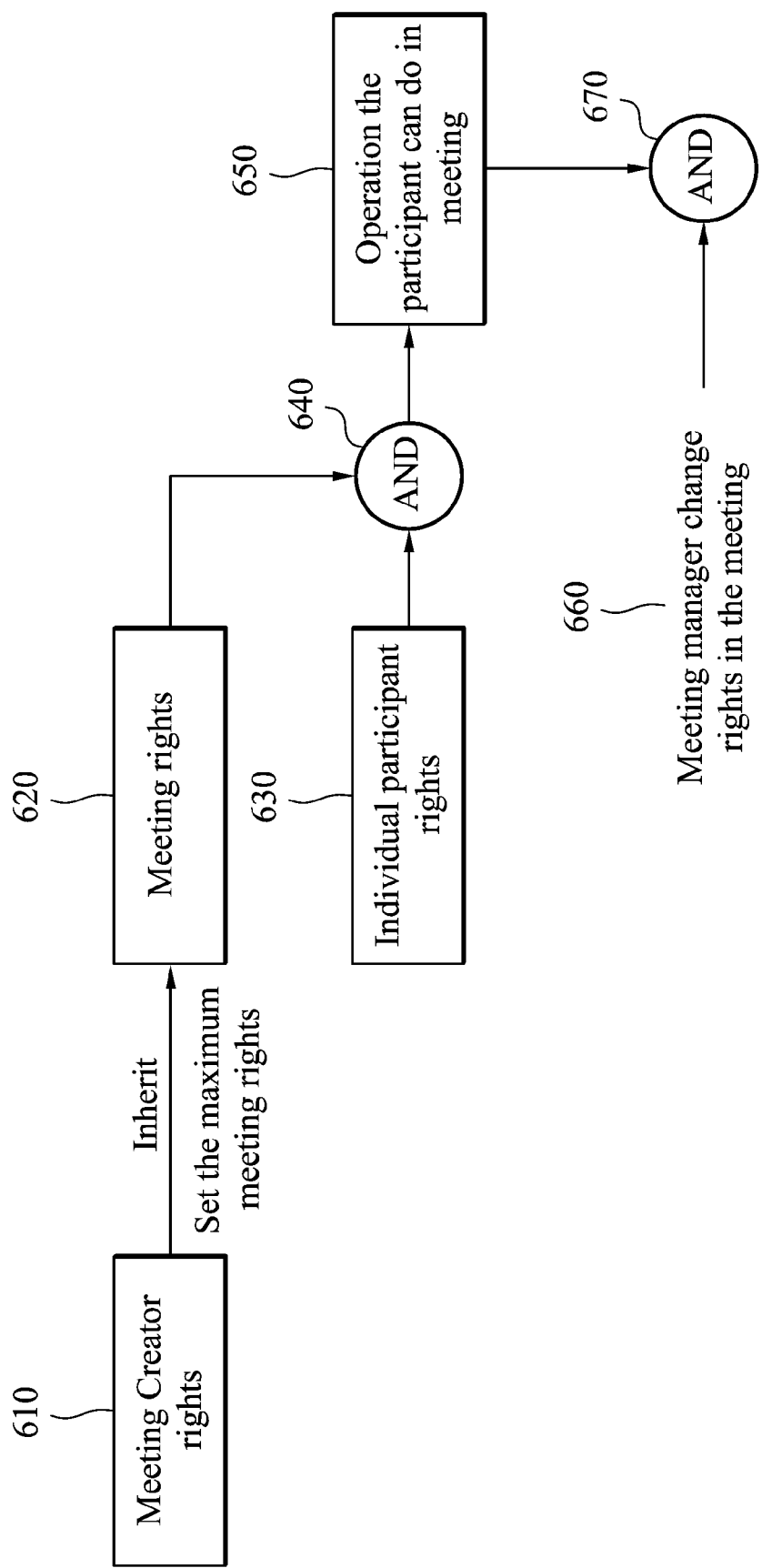
FIG. 6 shows a block diagram of another embodiment of the present invention.

Please refer to FIG. 6, which shows a block diagram of another embodiment of the present invention. A block 610 may represent user rights of a meeting creator. When the meeting is created, a block 620 representing meeting rights of the meeting, is inherited from the block 610. In an example, all rights granted to the creator, as block 610, is inherited by the block 620. In other words, it set the maximum meeting rights according to the creator's user rights. For each participant, a block 630 represents the granted user rights. In order to determine the right of each participant, a logical AND operation 640 is done by comparing the corresponding meeting right and the corresponding user right of participant. The result of the AND operation 640 is represented as a block 650. Furthermore, an optional dynamic rights block could also be represented as a block 660. Similar to other embodiments, the dynamic rights may be check on and/or off during the meeting by a meeting manager and/or the creator. In such case, another AND operation 670 may be operated by comparing the block 660 and the block 670 to retrieve the final result of the right operation.

Figure 7:
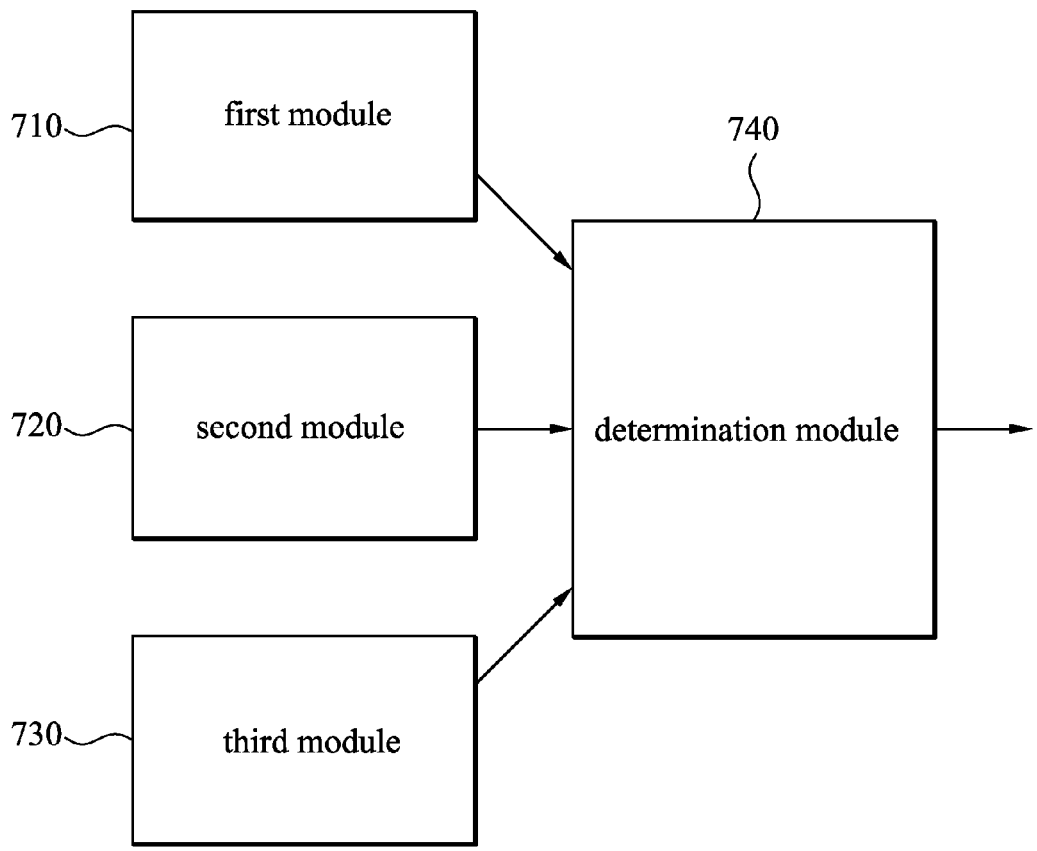
FIG. 7 shows an apparatus for determining a plurality of rights of each participant in a network conference system in accordance with an embodiment of the present invention.

Please refer to FIG. 7, which shows an apparatus for determining a plurality of rights of each participant in a network conference system in accordance with an embodiment of the present invention. The apparatus 700 comprises a first module 710 for storing a plurality of meeting rights of a meeting according to associated user rights of a meeting creator; a second module 720 for storing a plurality of participant rights according to associated user rights of a participant; a third module 730 for storing a plurality of dynamic rights according to assigned user rights of a meeting manager; and a determination module 740 for determining one of the plurality of each participant is granted in response to the corresponding meeting right, the corresponding participant right, and the corresponding dynamic right are all granted.

Figure 8:
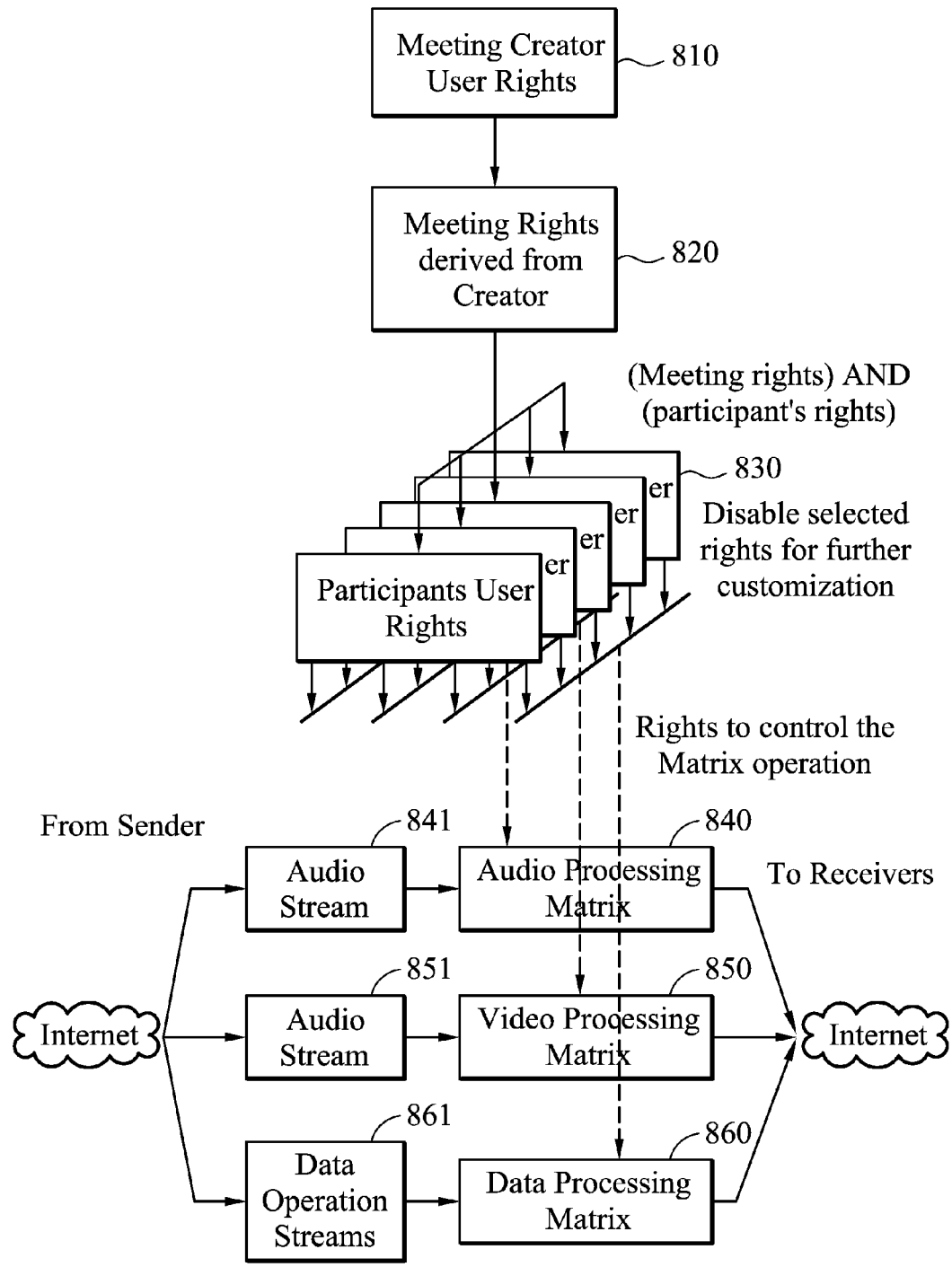
FIG. 8 illustrated a block diagram of an embodiment according to the present invention.

Please refer to FIG. 8, which illustrated a block diagram of an embodiment according to the present invention. Analogous to FIG. 6, the block 810 represents user rights of a meeting creator and the block 820 represents meeting rights derived from the creator. For each participant, the associated rights could be calculated according to participant's user rights and meeting rights of the meeting in each corresponding block 830. If further customization is done dynamically by a manager of the meeting, some selected rights of participants may be disabled also by each corresponding block 830. The output result of block 830 is used to control matrix operations comprising audio processing matrix 840, video processing matrix 850, and data processing matrix 860, which receive corresponding audio stream 841, video stream 851, and data stream 861, respectively. FIG. 8 depicts the programmability of the right operation in the runtime. The output results of block 830 are used to control the encoding and decoding paths implemented by the matrixes 840, 850, and 860.

Some examples may be given to describe the variety customizations of this invention. For the most common group meetings, all participants have equal rights to see and to listen, all participants have the audio-in, audio-out, video-in and video-out rights enable.

For Lecture, the teacher has all rights while students have only audio-out and video-out rights. All students listen and watch the teacher audio and video. Student has to request to speak, when the student is granted to speak, his/her audio-in right is enabled. If the system is to put the video of this student for all to see, his video-in right is also enabled.

For a panel discussion with large audience, all the panel members have the full rights, so they can be seen by all audience. Audience has only the audio-out and video-out rights. So, they can listen and see panel members all the time. If there is a Q&A session, the one granted to ask question will have the audio-in right enabled.

In a board meeting that a low ranking manager is to make presentation or standby for questions, the low ranking manager should not hear the on-going discussion in the meeting. He will have the audio-in and audio-out right disabled when he is not asked to speak.

When a secret viewer is required to monitor the progress of a meeting, he will has his video-in and audio-in rights disabled, so he will not be on the video while he can watch and listen to the meeting.

In conclusion, a disclosed system designed based on the fine grain control has the maximal degree of flexibility to satisfy all situations. For example, the same system can simulate normal small group meeting in the conference rooms, large broadcast type of meetings with or without audio return, panel discussion with audience, invisible monitor watching a focus group discussion, lecture classes . . . , etc. We can also turn off video to allocate all available bandwidth to audio for those in poor network areas. When the performance of Internet degrades, we can turn the video conference to an audio conference by turning off all the video.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic system in a computer system for network conference, wherein the electronic system comprises hardware, the electronic system comprising:
   a user right module for storing a plurality of user rights associated to each user of the electronic system configured before a meeting is created;
   a meeting right module for creating the meeting having a plurality of meeting rights according to associated user rights of a meeting creator;
   a participant right module for determining a plurality of participant rights of a participant according to the plurality of meeting rights and a plurality of user rights of the participant
   a plurality of participant client modules for receiving and sending media stream according to the plurality of participant rights of corresponding participant; and
   a matrix module for processing and distributing media stream to and from the plurality of participant client modules according to the plurality of participant rights,
   wherein only one participant of the meeting is granted to have a meeting creation and management right and assigned as a manager, and, during the meeting, the manager is transferable among the participants of the meeting, wherein the manager for creating a meeting having the maximum meeting rights according to associated user rights of the manager, wherein the user right module, the meeting right module, and the participant right module, the plurality of participant client modules, and the matrix module are executed by the hardware of the electronic system.

2. The electronic system of claim 1, wherein the plurality of user rights comprises a
audio-in right;
video-in right;
audio-out right;
video-out right;
meeting recording right;
file transfer right; and
meeting creation right to create the meeting.

3. The electronic system of claim 1, further comprising:
a dynamic right module for determining the plurality of participant rights of the participant according to a plurality of dynamic rights of the participant during the meeting, wherein one of the plurality of participant rights of the participant is granted if the corresponding dynamic right is granted.

4. The electronic system of claim 3, wherein only one participant of the meeting is granted to have a meeting creation and management right and assigned as a manager, wherein the plurality of dynamic rights of each participant are defined by a meeting manager.

5. The electronic system of claim 1, wherein the participant right module determines the plurality of participant rights of the participant according to a result of a logical AND operation between the plurality of meeting rights and the plurality of user rights of the participant.

6. A method for network conference in an electronic system, wherein the electronic system having a user right module for storing a plurality of user rights associated to each user of the electronic system configured before a meeting is created, wherein the method comprising:
creating the meeting having a plurality of meeting rights according to associated user rights of a meeting creator;
determining a plurality of participant rights of a participant according to the plurality of meeting rights and a plurality of user rights of the participant; and
receiving and sending media stream, in a plurality of participant client modules of the electronic system, according to the plurality of participant rights of the corresponding participant
processing and distributing media stream, in a matrix module of the electronic system, to and from the plurality of participant client modules according to the plurality of participant rights, wherein only one participant of the meeting is granted to have a meeting creation and management right and assigned as a manager, and, during the meeting, the manager is transferable among the participants of the meeting, wherein the manager for creating a meeting having the maximum meeting rights according to associated user rights of the manager.

7. The method of claim 6, wherein the plurality of user rights comprises a
audio-in right;
video-in right;
audio-out right;
video-out right;
meeting recording right;
file transfer right; and
meeting creation right to create the meeting.

8. The method of claim 6, further comprising:
determining the plurality of participant rights of the participant according to a plurality of dynamic rights of the participant during the meeting, wherein one of the plurality of participant rights of the participant is granted if the corresponding dynamic right is granted.

9. The method of claim 8, wherein only one participant of the meeting is granted to have a meeting creation and management right and assigned as a manager, wherein the plurality of dynamic rights of each participant are defined by a meeting manager.

10. The method of claim 6, wherein the plurality of participant rights of the participant are determined according to a result of a logical AND operation between the plurality of meeting rights and the plurality of user rights of the participant.

11. An apparatus in a computer system for determining a plurality of rights of each participant in a meeting by a network conference system, wherein the apparatus comprises hardware, the apparatus comprising:
a first module for storing a plurality of meeting rights of the meeting according to a plurality of user rights of a meeting creator;
a second module for storing a plurality of participant rights of a participant according to a plurality of user rights of the participant;
a third module for storing a plurality of dynamic rights according to assigned user rights of a meeting manager; and
a determination module for determining the plurality of participant rights of the participant according to the plurality of meeting rights and the plurality of user rights of the participant,
wherein the plurality of user rights of the meeting creator and the plurality of user rights of the participant are configured before the meeting is created, wherein the first module, the second module, and the determination module are executed by the hardware of the apparatus.

12. The apparatus of claim 11, wherein the plurality of user rights comprises a
audio-in right;
video-in right;
audio-out right;
video-out right;
meeting recording right;
file transfer right; and
meeting creation right to create the meeting.

13. The apparatus of claim 11, wherein the determination module determines the plurality of participant rights of the participant according to a result of a logical AND operation between the plurality of meeting rights and the plurality of user rights of the participant.

14. The apparatus of claim 13, further comprising:
a third module for storing a plurality of dynamic rights of the participant defined by a meeting manager, wherein the third module is executed by the hardware of the apparatus.

15. The apparatus of claim 14, wherein the plurality of participant rights of the participant are set according to a logical AND operation between the result and the plurality of dynamic rights of the participant.

16. A method for determining a plurality of participant rights of a participant in a meeting by a network conference system, comprising:
setting a plurality of meeting rights according to a plurality of user rights of a meeting creator; and setting the plurality of participant rights of the participant according to the plurality of meeting rights and a plurality of user rights of the participant, wherein the plurality of user rights of the meeting creator and the plurality of user rights of the participant are configured before the meeting is created.

17. The method of claim 16, wherein the plurality of participant rights of the participant are set according to a result of a logical AND operation between the plurality of meeting rights and the plurality of user rights of the participant.

18. The method of claim 17, wherein the plurality of participant rights of the participant are set according to a logical AND operation between the result and a plurality of dynamic rights of the participant, wherein the plurality of dynamic rights of the participant is determined by a meeting manager.

19. The method of claim 16, wherein the plurality of user rights of the meeting creator and the plurality of user rights of the participant are stored in a user right module.

20. The method of claim 16, wherein the plurality of user rights comprises a meeting creation right to create the meeting.

\* \* \* \* \*